United States Patent [19]

Abretske et al.

[11] Patent Number: 4,993,610
[45] Date of Patent: Feb. 19, 1991

[54] PROTECTIVE BOX BUMPER AND ASSOCIATED MOVABLE FRAME, ON VEHICLE

[75] Inventors: Edward V. Abretske; Joseph M. Abretske; Anthony I. Abretske, all of West Covina, Calif.

[73] Assignee: Canyon City 4×4, Azusa, Calif.

[21] Appl. No.: 478,620

[22] Filed: Feb. 12, 1990

[51] Int. Cl.$^5$ .................. B62D 43/02; B60R 11/06
[52] U.S. Cl. .................. 224/42.004; 224/42.013; 224/42.021; 293/106; 296/37.006
[58] Field of Search .......... 224/42.03 R, 42.03 A, 224/42.04, 42.05, 42.06, 42.12, 42.13, 42.21, 42.24, 42.45 R, 42.42; 293/106, 117; 296/37.2, 37.6; 206/373

[56] References Cited

U.S. PATENT DOCUMENTS

| | | | |
|---|---|---|---|
| 2,492,914 | 12/1949 | Barden | 293/117 X |
| 2,698,118 | 12/1954 | Dickason | 224/42.21 |
| 3,371,832 | 3/1968 | Sekino et al. | 224/42.21 |
| 3,614,136 | 10/1971 | Dent | 224/42.04 X |
| 4,282,994 | 8/1981 | Hilliard | 224/42.06 |
| 4,570,986 | 2/1986 | Sams | 293/117 |
| 4,676,415 | 6/1987 | Kennedy | 224/42.06 |
| 4,756,457 | 7/1988 | Polk | 224/42.03 A |
| 4,771,926 | 9/1988 | Anderson et al. | 224/42.13 |
| 4,869,409 | 9/1989 | Wright | 224/42.21 |
| 4,915,437 | 3/1990 | Cherry | 296/37.6 |

*Primary Examiner*—Henry J. Recla
*Assistant Examiner*—Robert M. Fetsuga
*Attorney, Agent, or Firm*—William W. Haefliger

[57] ABSTRACT

A heavy duty protective apparatus mounted at the rear of a vehicle, comprising metal containers extending laterally of a vehicle to serve as a bumper, the containers forming interior spaces to receive and transport equipment such as tools and the like, the interior spaces adapted to be washed out by draining water downwardly, and a protective frame unit extending laterally of the vehicle rear, above the containers, and forming protected space to receive other equipment, the frame unit mounted to the vehicle to be guided for rearward swinging movement away from the vehicle rear to provide access to the vehicle rear.

12 Claims, 4 Drawing Sheets

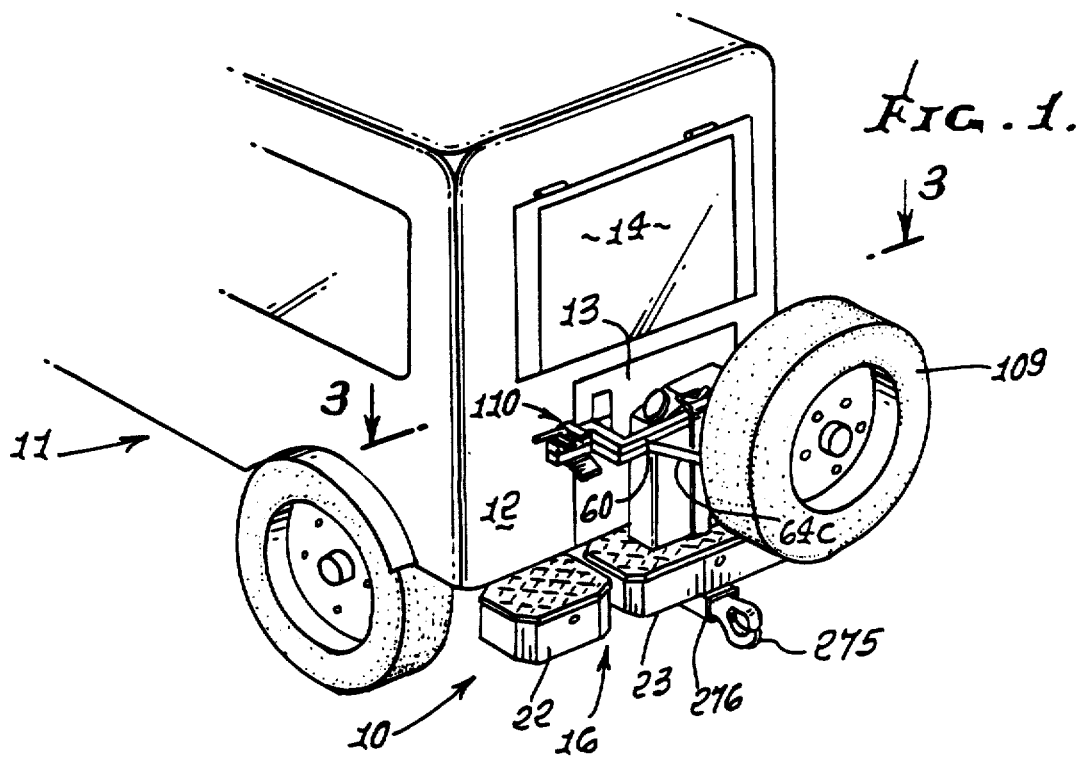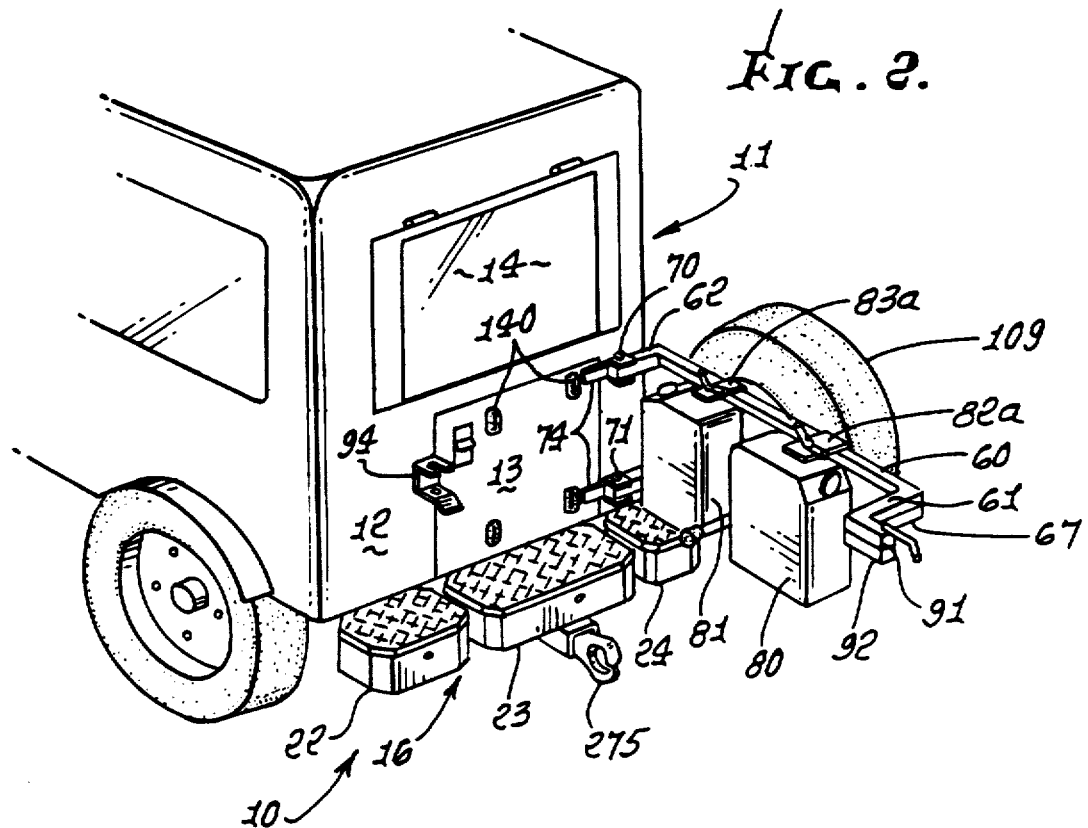

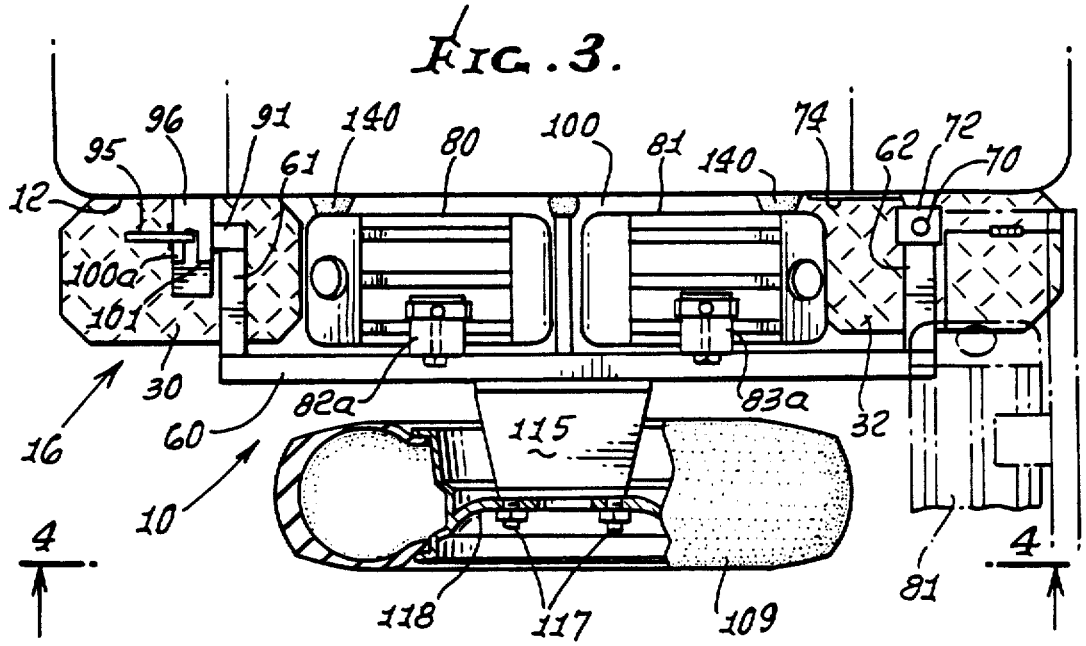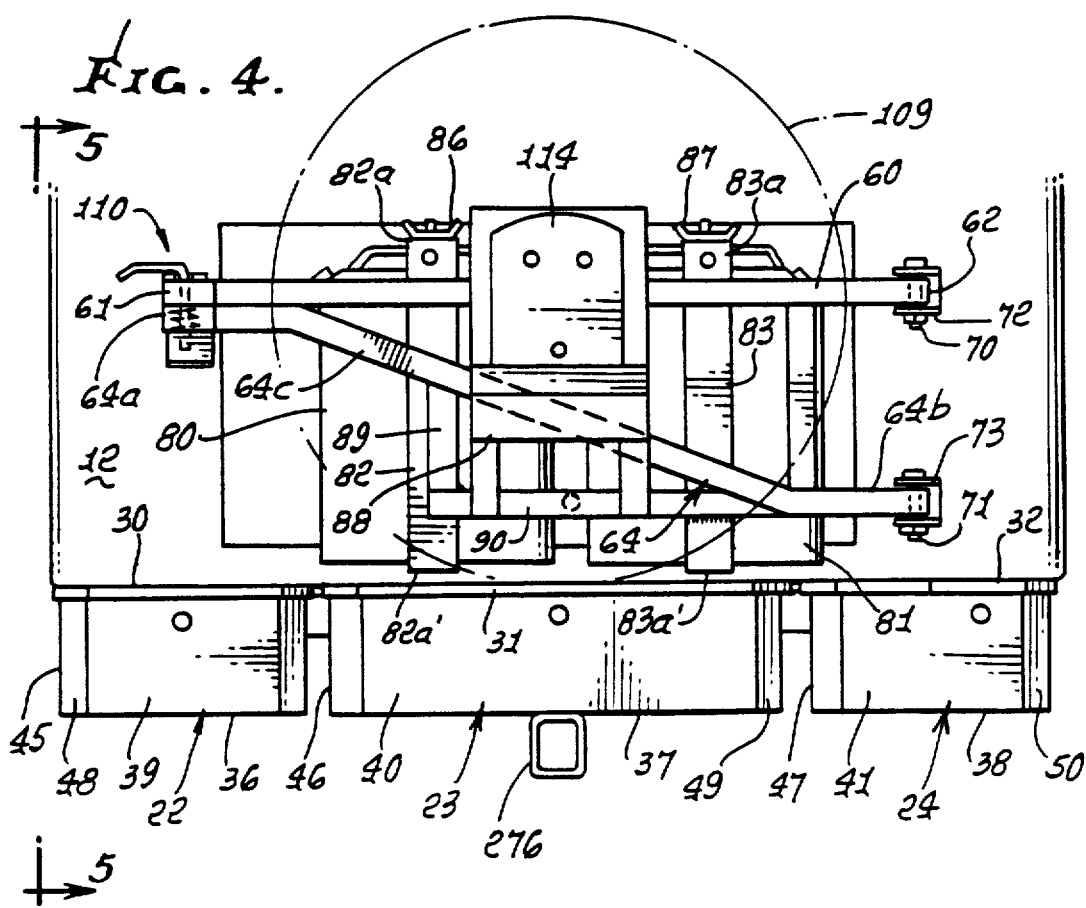

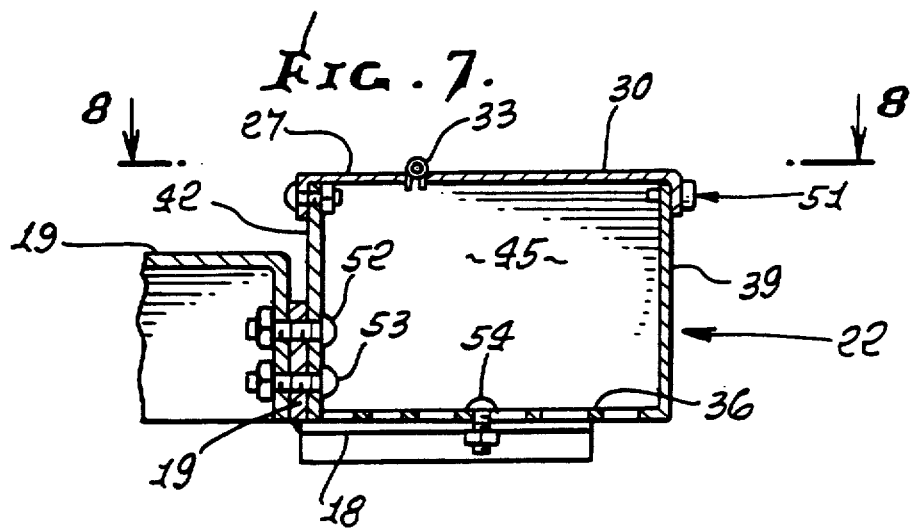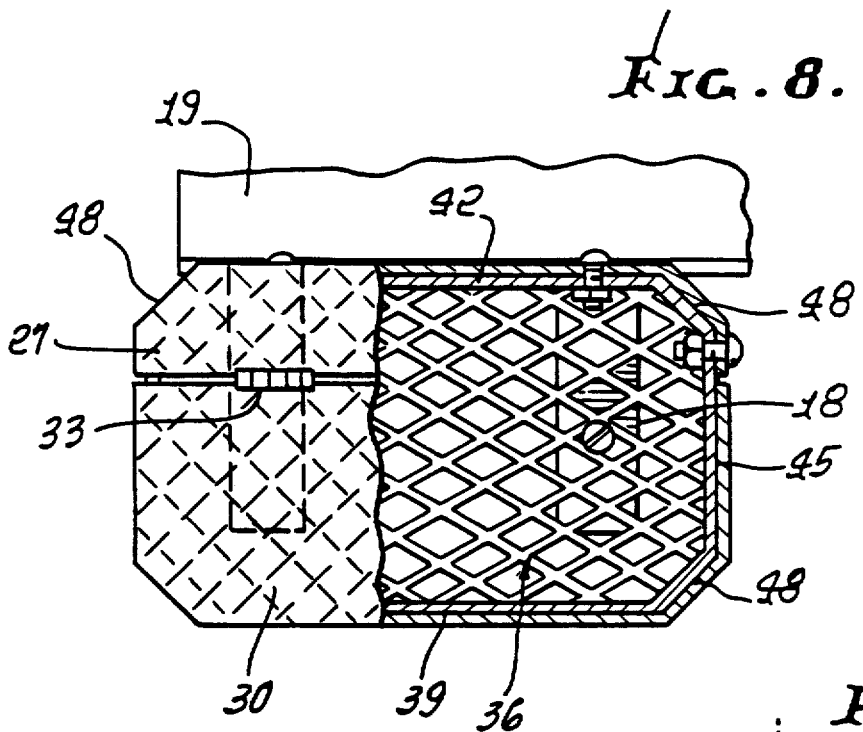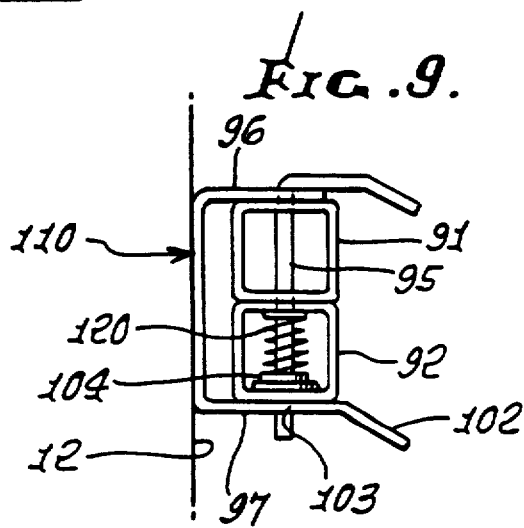

PROTECTIVE BOX BUMPER AND ASSOCIATED MOVABLE FRAME, ON VEHICLE

BACKGROUND OF THE INVENTION

This invention relates generally to protective equipment on vehicles; and more particularly it concerns heavy duty protective equipment mounted at the rear of vehicles, such equipment also having storage capability.

There is continual need for more storage space in or on vehicles, especially four-wheeled utility vehicles such as so-called 4×4 units having a rear door. If the storage space is outside the vehicle body, it should be well protected, and lockable or normally inaccessible to persons other than the vehicle owner. No prior apparatus is believed known, which meets the requirements, as well as incorporating the unusually advantageous construction, modes of operation and results as are incorporated in the present invention.

SUMMARY OF THE INVENTION

It is a major object of the invention to provide simple, effective and easy to use protective apparatus that meets the above needs. Basically, the apparatus is mounted at the rear of the vehicle, and comprises (a) metal container means and extending laterally of a vehicle to serve as a bumper, the container means forming interior space or spaces to receive and transport equipment such as tools and the like, the interior space adapted to be washed out by draining water downwardly, (b) and a protective frame unit extending laterally of the vehicle rear, above the container means, and forming protected space to receive other equipment, (c) the frame unit mounted to the vehicle to be guided for rearward movement away from the vehicle rear to provide access to the vehicle rear.

As will be seen, the invention also provides for inclusion of fluid container means protectively carried by the frame unit, adjacent the vehicle rear.

Typically, the vehicle has hinge structure for a rear door that is accessible when the frame unit is moved rearwardly away from the vehicle rear, the frame unit mounted on said hinge structure to be swung away from the vehicle body rear door. In this regard, a latch part may be located on the frame unit to rearwardly connect to a latching part on the vehicle body. A vehicle tire may be carried by the frame unit, rearwardly of the protected space formed by the frame unit, and the tire adds to the overall protective features, as against rear-end impacts.

It is another object of the invention to provide the metal container means in the form of at least one container having a heavy-duty lid which is upwardly movable to expose the container interior space, and a heavy duty bottom wall that forms a grid so that wash water may drain from the container. That metal container means may advantageously include three laterally elongated containers, rigidly bolted to vehicle frame structure to extend in a row. Each such container may then have a heavy-duty lid which is upwardly movable to expose the container interior space, and a heavy duty bottom wall that forms a grid so that wash water may drain from the container. In the event of damage, by impact, to one container, the others remain intact, since they are separated.

These and other objects and advantages of the invention, as well as the details of an illustrative embodiment, will be more fully understood from the following specification and drawings, in which:

DRAWING DESCRIPTION

FIG. 1 is a rear perspective view of a vehicle to which apparatus of the invention has been applied;

FIG. 2 is a view like FIG. 1 showing the apparatus, with a frame unit displaced rearwardly;

FIG. 3 is an enlarged plan view taken on lines 3—3 of FIG. 1;

FIG. 4 is an elevation taken on lines 4—4 of FIG. 3;

FIG. 7 is a section taken on lines 7—7 of FIG. 6;

FIG. 8 is a plan view taken on lines 8—8 of FIG. 7; and

FIG. 9 is an enlarged side elevation showing a latch construction.

DETAILED DESCRIPTION

Figure 5:
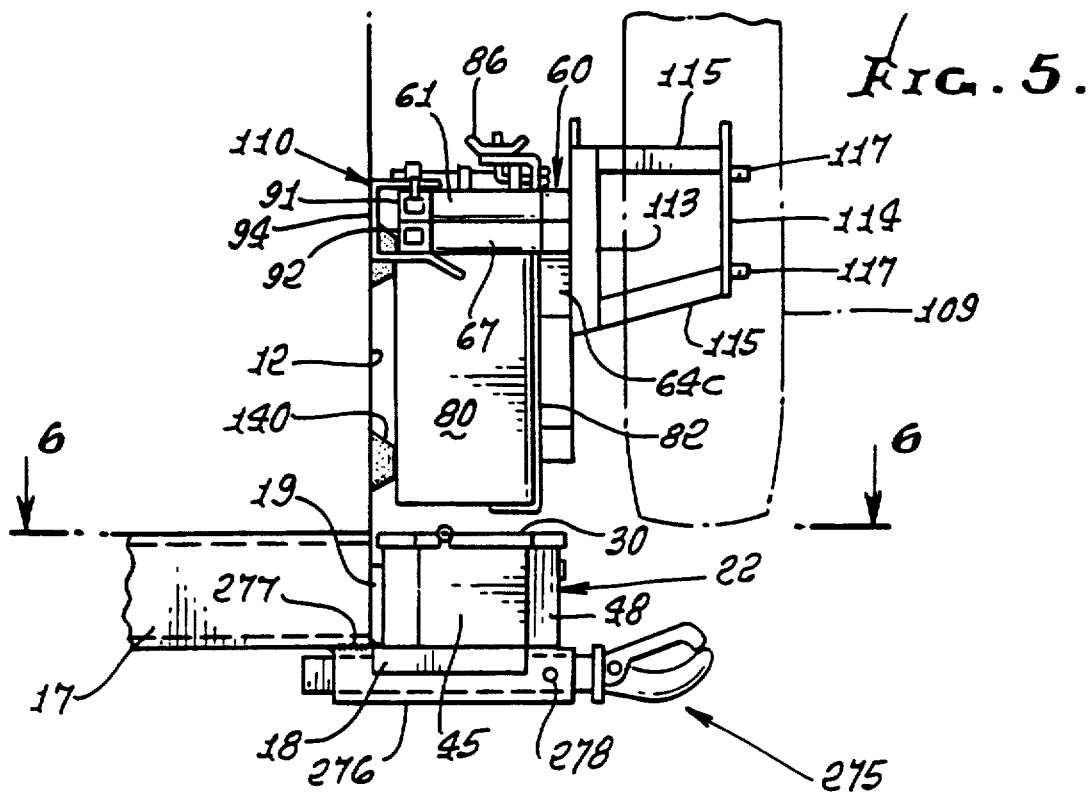
FIG. 5 is an elevation taken on lines 5—5 of FIG. 4.

In FIGS. 1 and 2, heavy duty protective apparatus is shown at 10, mounted at the rear of the vehicle 11. The latter has a rear panel 12, and a door 13 located below rear window 14, in panel 12.

In accordance with the invention, metal container means is provided to extend laterally of the vehicle so as to serve as a bumper, the container means forming interior space to receive and transport equipment such as tools and the like, the interior space adapted to be washed out by draining water downwardly. The heavy duty metallic container means is generally indicated at 16, and juts rearwardly from the vehicle frame 17 to which it is attached, via support 18 and structure 19, at bumper level, i.e. to serve as a multi-bumper. The heavy duty container means includes at least one container, and preferably multiple such containers, as indicated at 22, 23 and 24. The three containers' heavy duty structure is as follows:

| Structure | Containers | | |
|---|---|---|---|
| | 22 | 23 | 24 |
| top wall | 27 | 28 | 29 |
| top hinged lid | 30 | 31 | 32 |
| hinge | 33 | 34 | 35 |
| bottom wall (grid) | 36 | 37 | 38 |
| vertical front wall | 39 | 40 | 41 |
| vertical rear wall | 42 | 43 | 44 |
| side walls | 45 | 46 | 47 |
| corner angle plates | 48 | 49 | 50 |

The three heavy duty containers provide the following advantages.

(1) They serve as multiple bumpers, whereby if one is deformed as by impact with another vehicle, only that one box bumper needs replacement;

(2) Each box or container can contain tools or other objects;

(3) Each box or container can be washed, i.e. hosed out, to clean the tools or contents; etc., and water drains through the grids 36, 37, and 38. The vehicle interior is thereby kept clean;

(4) The heavy duty lids 30-32 are hinged to walls 27, 28 and 29 to be lifted and to tilt forwardly toward the rear of the vehicle, in rest position, as during hosing; also the lids and walls 27, 28 and 29 are corrugated or rippled, for added strength;

(5) The lids may be locked in position. See lock 51, in FIG. 7;

(6) The bumper boxes can be easily removed, if desired, and replaced if deformed by impact as by loosening of bolts 52-54 as seen in FIG. 7;

(7) The vertical corners of the boxes are strengthened by integral angle plates 48-50. All of the side walls of containers that extend forwardly, act to distribute loading, in case of full impact.

Also provided is a protective frame unit extending laterally of the vehicle rear, above the container means, and forming protected space to receive other equipment. The frame unit is mounted to the vehicle to be guided for rearward movement away from the vehicle rear to provide access to the vehicle rear. As shown in the drawings, the frame unit may take the form of horizontal member 60 which extends laterally, and which has integral ends, 61 and 62, that extend forwardly, above the bumper box or container means, as is clear from FIG. 3. Such a frame unit provides additional protection against impact as from another vehicle. An additional lateral frame member is shown at 64 and has lateral horizontal legs 64a and 64b, and a diagonal leg 64c between 64a and 64b. Leg 64a is integral with one end of member 60, and leg 64b is spaced below the opposite end of member 60, and has a forwardly projecting end, below end 62. See also lower frame member 90.

The two ends 62 and 64a are pivotally attached, via pins 70 and 71 to hinge brackets 72 and 73 seen in FIG. 4. Brackets 72 and 73 are attached to the vehicle rear panel, and also serve to pivotally carry the rear door, as via plates 74, seen in FIG. 2. Thus, the frame unit may be swung rearwardly to FIG. 2 position, to allow rearward and outward pivoting of the vehicle rear door 13, i.e. access to that door is easily obtained. Also, use of existing door hinge brackets on a vehicle facilitates ease of installation of the frame unit, as described.

Note in FIGS. 2 and 3 that liquid holders, such as "Jeri" cans, 80 and 81 are carried by the frame unit in the protected space 100 it provides between the members 60 and 64 and the rear of the vehicle. Clamp brackets 82 and 83 are welded to members 60 and 90, and they project forwardly at 82a and 83a to rearwardly clamp the tops of the holders, as via wing nuts 86 and 87 seen in FIGS. 2 and 4, and attaching to bolts. The bottoms of the Jeri cans are clamped at 82a' and 83a' and extend above and adjacent the lids 30, 31 and 32, and are thus further protected. See also protective frame structures at 88, 89 and 90, attached to member 64, in FIG. 4.

A latch 110 is operable to attach the lateral terminals 91 and 92 of the forwardly projecting ends 61 and 67 (of members 60 and 64) to the vehicle rear panel 12. See in FIGS. 1, 2, 5 and 9 the latch keeper U-bracket 94 attached to panel 12, and the pin 95 that fits down through bracket flanges 96 and 97, and through the terminals 91 and 92. The pin is carried by the terminals, and the pin upper extent is received between tangs 100a and 101 of top flange 96. The pin may be pulled up to ride over the cam end 102 of lower flange 97 and then drops through hole 103 in that flange, to secure the latch. A spring 120 carried by terminal 92 urges the pin downwardly, via a flange 104 on the pin.

Finally, a vehicle spare tire 109 is carried by the frame unit, rearwardly of the protected space 100 formed by the U-shaped members 60 and 64, and the vehicle rear, as referred to. A vertical plate 113 is attached as by welding to members 60 and 64 (see FIG. 5) and supports a second and rearward plate 114, as by struts 115. Plate 114 carries bolts 117 that bolt the tire wheel hub plate 118 to plate 114. The tire, as located and carried, offers further protection to the Jeri cans. Note also bumpers 140 engagable by the cans.

Figure 6:
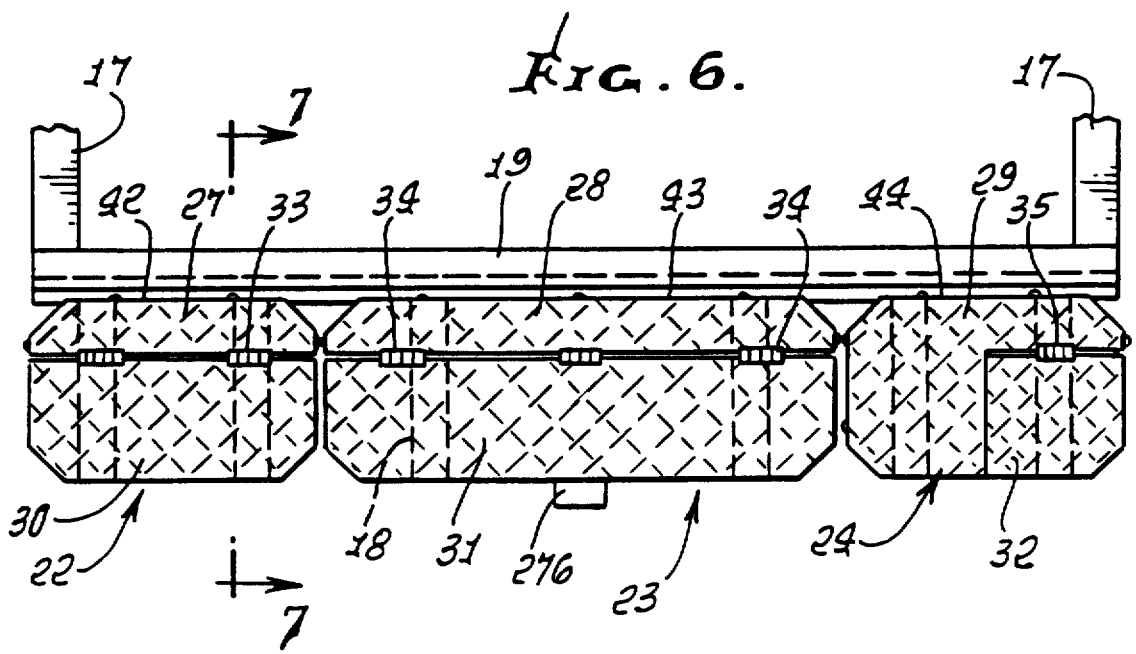
FIG. 6 is a plan view taken on lines 6—6 of FIG. 5.

A trailer hitch 275 is mounted on bracket 276 projecting rearwardly beneath box 23, as seen in FIGS. 5 and 6. Bracket 276 is attached to the frame 17 at 277. In FIG. 6 the hitch itself has been removed from the bracket, as by removal of a pin 278.

We claim:

1. Heavy duty protective apparatus mounted at the rear of a vehicle, comprising
   (a) metal container means and extending laterally of a vehicle to serve as a bumper, the container means forming interior space to receive and transport equipment such as tools and the like, the interior space opening downwardly sufficiently to be washed out by draining water downwardly,
   (b) and a protective frame unit extending laterally of the vehicle rear, above the container means, and forming protected space between the frame unit and vehicle rear to receive other equipment,
   (c) the frame unit mounted to the vehicle to be guided for rearward movement away from the vehicle rear to provide access to the vehicle rear,
   (d) the vehicle having hinge structure for a vehicle body rear door that is accessible when the frame unit is moved rearwardly away from the vehicle rear, the frame unit mounted on said hinge structure to be swung away from the vehicle body rear door.

2. The apparatus of claim 1 including fluid container means protectively carried by the frame unit, adjacent the vehicle rear.

3. The apparatus of claim 1 including a latch part on the frame unit to rearwardly connect to a latching part on the vehicle 4. The apparatus of claim 1 including a vehicle tire carried by the frame unit, rearwardly of said protected space formed by the frame unit.

5. The apparatus of claim 1 wherein said metal container means includes at least one container having a heavy-duty lid which is upwardly movable to expose the container interior space, and a heavy duty bottom wall that forms a grid so that wash water may drain from the container.

6. The apparatus of claim 1 wherein said metal container means includes three laterally elongated containers, rigidly attached to vehicle frame structure to extend in a row.

7. The apparatus of claim 6 wherein each container has a heavy-duty lid which is upwardly movable to expose the container interior space, and a heavy duty bottom wall that forms a grid so that wash water may drain from the container.

8. Heavy duty protective apparatus mounted at the rear of a vehicle comprising
   (a) metal container means extending laterally of a vehicle to serve as a bumper, the container means forming interior space to receive and transport equipment such as tools and the like, the interior space adapted to be washed out,
   (b) said metal container means including at least one container having a heavy-duty lid which is upwardly movable to expose the container interior space, and a heavy duty bottom wall that forms a grid so that wash water may drain from the container, (c) said metal container means including three separate laterally elongated containers, each individually rigidly bolted to vehicle frame structure to extend in a row.

9. Heavy duty protective apparatus mounted at the rear of a vehicle, comprising
   (a) a protective frame unit extending laterally of the vehicle rear, forming protected space between the frame unit and vehicle rear to receive equipment,
   (b) the vehicle having hinge structure for a vehicle body rear door that is accessible when the frame unit is moved rearwardly away from the vehicle rear, the frame unit mounted on said hinge structure to be swung away from the vehicle body rear door,
   (c) and including liquid holders in said protected space, and carried by said frame unit to move therewith.

10. The apparatus of claim 9 including a latch part on the frame unit to rearwardly connect to a latching part on the vehicle body.

11. The apparatus of claim 9 including a vehicle tire carried by the frame unit, rearwardly of said protected space formed by the frame unit.

12. Heavy duty protective apparatus mounted at the rear of a vehicle, comprising
   (a) metal container means and extending laterally of a vehicle to serve as a bumper, the container means forming interior space to receive and transport equipment such as tools and the like, the interior space opening downwardly sufficiently to be washed out by draining water downwardly,
   (b) and a protective frame unit extending laterally of the vehicle rear, above the container means, and forming protected space between the frame unit and vehicle rear to receive other equipment,
   (c) the frame unit hingedly mounted to the vehicle to be guided for rearward movement away from the vehicle rear to provide access to the vehicle rear,
   (d) and including fluid container means protectively carried by the frame unit, adjacent the vehicle rear.

* * * * *